United States Patent [19]

Chang et al.

[11] Patent Number: 5,632,794
[45] Date of Patent: May 27, 1997

[54] METHOD AND APPARATUS FOR COOLING A GLASS PRESSING PLUNGER

[75] Inventors: Zung-Sing Chang, Horseheads; Albert M. Gossie; Katherine W. Hughes, both of Painted Post; Michael W. Matt, Elmira; Jason S. Watts, Horseheads, all of N.Y.

[73] Assignee: Corning Incorporated, Corning, N.Y.

[21] Appl. No.: 455,362

[22] Filed: May 31, 1995

[51] Int. Cl.$^6$ .............................. C03B 9/38; C03B 11/12
[52] U.S. Cl. .............................. 65/83; 65/165; 65/249; 65/265; 65/267; 65/319; 65/355; 65/356; 65/362; 425/384; 425/407; 425/507; 425/509; 425/547; 425/548; 425/552; 425/DIG. 35
[58] Field of Search .............................. 65/165, 249, 265, 65/319, 355, 356, 362, 83; 425/384, 407, 507, 509, 547, 548, 552, DIG. 35

[56] References Cited

U.S. PATENT DOCUMENTS

| | | |
|---|---|---|
| 608,022 | 7/1898 | Bingham .............................. 65/356 |
| 3,364,003 | 1/1968 | Eyles et al. . |
| 3,997,318 | 12/1976 | Takatoki et al. . |
| 4,059,429 | 11/1977 | Carmi et al. . |
| 4,094,657 | 6/1978 | Carmi et al. . |
| 4,140,512 | 2/1979 | Carmi et al. . |
| 4,218,231 | 8/1980 | Lemmon et al. . |
| 4,251,253 | 2/1981 | Becker et al. . |
| 4,502,879 | 3/1985 | Foster . |
| 4,525,191 | 6/1985 | Fenton . |
| 4,609,703 | 9/1986 | Kulig . |
| 4,623,374 | 11/1986 | Doud et al. . |
| 4,629,488 | 12/1986 | Doud et al. . |
| 4,657,573 | 4/1987 | Jones . |
| 4,659,357 | 4/1987 | Doud . |
| 4,783,212 | 11/1988 | Loffler . |
| 4,790,867 | 12/1988 | Chang et al. . |
| 4,824,461 | 4/1989 | Cavazos . |
| 5,167,688 | 12/1992 | Cavazos . |
| 5,383,780 | 1/1995 | McCready et al. .............. 425/552 |

*Primary Examiner*—Donald E. Czaja
*Assistant Examiner*—Michael Philip Colaianni
*Attorney, Agent, or Firm*—Timothy M. Schaeberle

[57] ABSTRACT

The present invention is directed to a method and an apparatus for forming glass articles from molten glass involving differentially cooling a plunger for press forming glass articles in a cooperative forming mold. More specifically, the method involves introducing cooling fluid into an inlet cooling cavity located in the upper portion of the plunger and causing the cooling fluid to flow from the inlet cooling cavity into a cooling passage located along the periphery of the nose portion and thereafter to flow into a outlet cooling cavity located in the upper portion of the plunger and thereafter exhausting the spent cooling fluid from the plunger.

8 Claims, 3 Drawing Sheets

METHOD AND APPARATUS FOR COOLING A GLASS PRESSING PLUNGER

BACKGROUND OF THE INVENTION

The present invention relates generally to glass forming and particularly to a method and apparatus for altering the temperature of mold equipment such as forming molds and plungers, especially those plungers with narrow long portions requiring increased heat removal.

Glass articles are customarily formed by placing a charge of hot molten glass into a mold cavity and then introducing a plunger into the charge of glass so as to press-form a finished article between the mold and the plunger. A major consideration in this forming process is the control of heat distribution and removal of heat in order that the surfaces which form the glass articles are neither too hot nor too cold. The repeated exposure of the mold and plunger, as they come into contact with the molten glass during the forming operation, causes the temperatures thereof to rise, and therefore it is imperative that they be cooled to within acceptable working ranges. If, for example, the mold is not cooled sufficiently, it will reach a temperature at which the glass will begin to fuse to the metal interior forming surface of the mold; which, necessitates the stoppage of the forming equipment in order to repair the damage caused by the fusing. If the temperature of the mold is not maintained, or if permitted to fall below a predetermined level, wrinkles, checks and other imperfections can result in the finished article.

The problem of maintaining the mold equipment within a limited temperature range during various production speeds is aggravated by differential rates of heat removal from the mold equipment which occurs with articles exhibiting certain unique types of geometries. Furthermore, the rate of heat removal from the molten glass by the mold equipment depends to a large extent on the glass thickness and its geometric shape in localized regions. If the glass item to be produced has regions of both broad flat or slightly curved surfaces and also regions of relatively sharp corners, the rate of heat exchange between the glass and the mold equipment can differ significantly from one region to the next. Under such circumstances the conventional cooling systems for plungers used in glass pressing are inadequate for handling differential cooling rates in adjacent regions or zones because present methods of cooling plungers involved in a single source of cooled fluid entering the plunger in one single chamber. This single source of cooling fluid thereafter flowed via random motion to various locations and generally collected at a single location with resultant individually varying return flow paths which affect one another causing arbitrary and undesirable side effects in the cooling system design and in plunger thermal performance.

One such solution to single-source single-collection problem of cooling is disclosed in related patents U.S. Pat. No. 4,059,429 (Carmi et al.) and U.S. Pat. No. 4,094,657 (Carmi et al.); a differentially cooled plunger apparatus and a method of differentially cooling a plunger respectively. In general, these patents disclose a plunger and the use of a plunger designed in such a manner that a single-source cooling fluid is supplied to different zones or regions of the plunger for differential cooling of the zones or regions; specifically, the regions possessing sharp curvatures and requiring high heat removal and regions possessing lesser curvatures requiring lesser heat removal.

Although the above described Carmi patents disclose methods of press-forming designed for supplying differential cooling to areas where differential heat removal is necessary, the method and the apparatus is not geometrically suitable for use in the formation of articles which exhibit long, narrow protuberances, i.e., specifically, those type of products which may be found in the lighting industry which incorporate sharp angles and/or narrow, long "noses". The large area required for the prior art baffle, plenum chamber and the plurality of cooling fluid passages makes the aforementioned prior art method of differential cooling unsuitable in those molding configurations having narrow plungers or nose portions which require a differential heat removal rate when compared to the rest of the plunger portion.

This being the case, the need remains for a high production method and apparatus for press-forming glass articles which exhibit geometries possessing long, narrow protuberances.

SUMMARY OF THE INVENTION

Briefly, the present invention provides for an apparatus for forming glass articles from molten glass comprising a forming mold, a neck ring mold, a plunger head having a coolant inlet passage and a coolant outlet passage, and a plunger having an upper body portion and a lower nose portion. The upper body portion of the plunger is provided with a pair of enclosed cooling cavities, including a inlet and an outlet cooling cavity, separated by a dividing wall and for supplying and returning cooling fluid; these cooling cavities are connected to the inlet and outlet passages, respectively. The lower nose portion is provided with a cooling passage having an inlet and an outlet end connected to the inlet and outlet cooling cavities, respectively. The cooling passage preferably is located along the periphery of the nose portion.

Also provided herein is a method of differentially cooling a plunger for press forming glass articles in a cooperative forming mold. Specifically, the method involves introducing a cooling fluid or coolant into an inlet cooling cavity located in the upper portion of the plunger and causing the cooling fluid to flow from the inlet cooling cavity into a cooling passage located along the periphery of the nose portion. Thereafter, the cooling fluid is caused to flow into an outlet cooling cavity located in the upper portion of the plunger and finally, the spent cooling fluid is exhausted from the plunger.

DETAILED DESCRIPTION OF THE INVENTION

Figure 1:
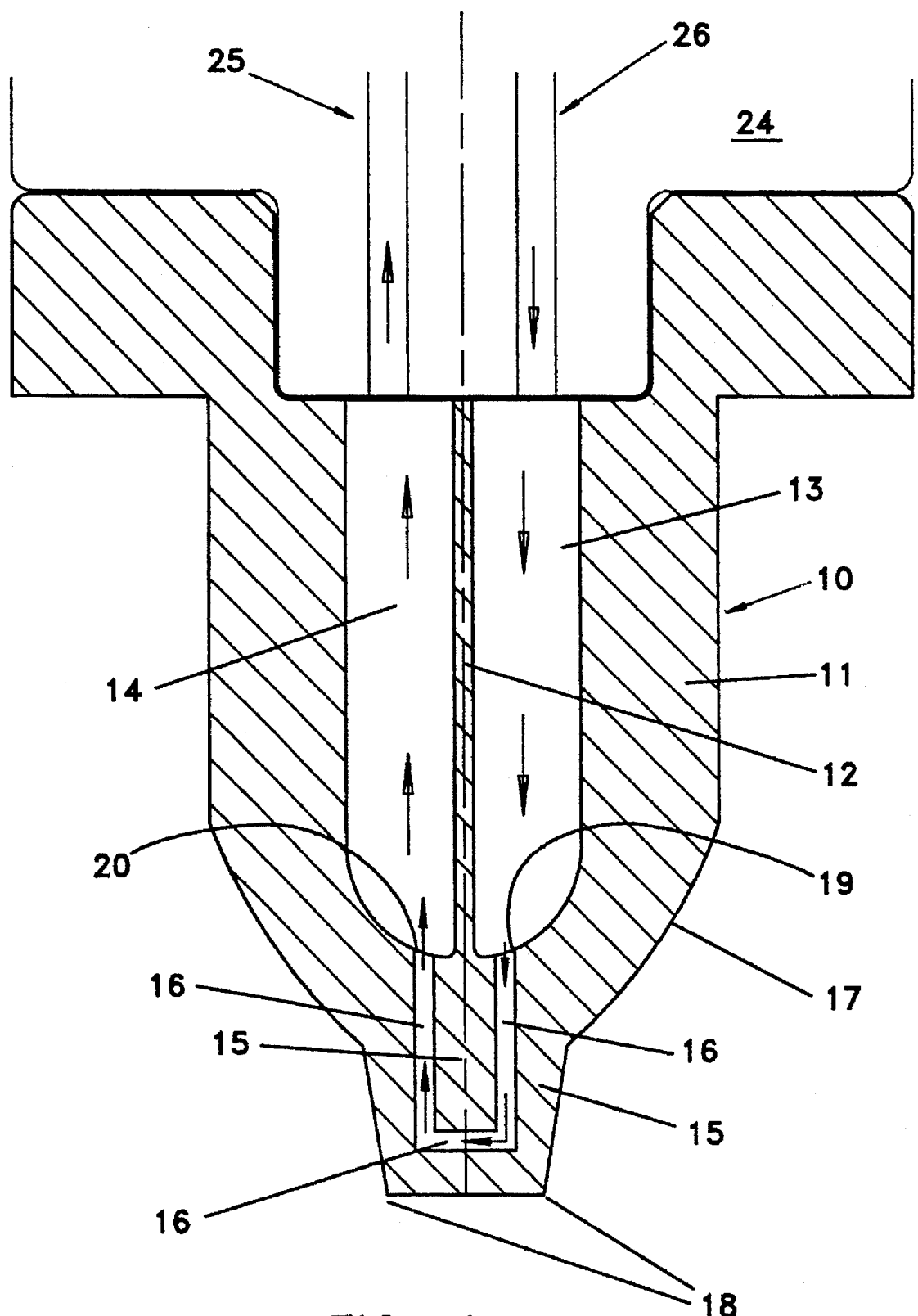
FIG. 1 is cross sectional elevational view of a glass forming plunger embodying the invention.
Figure 3:
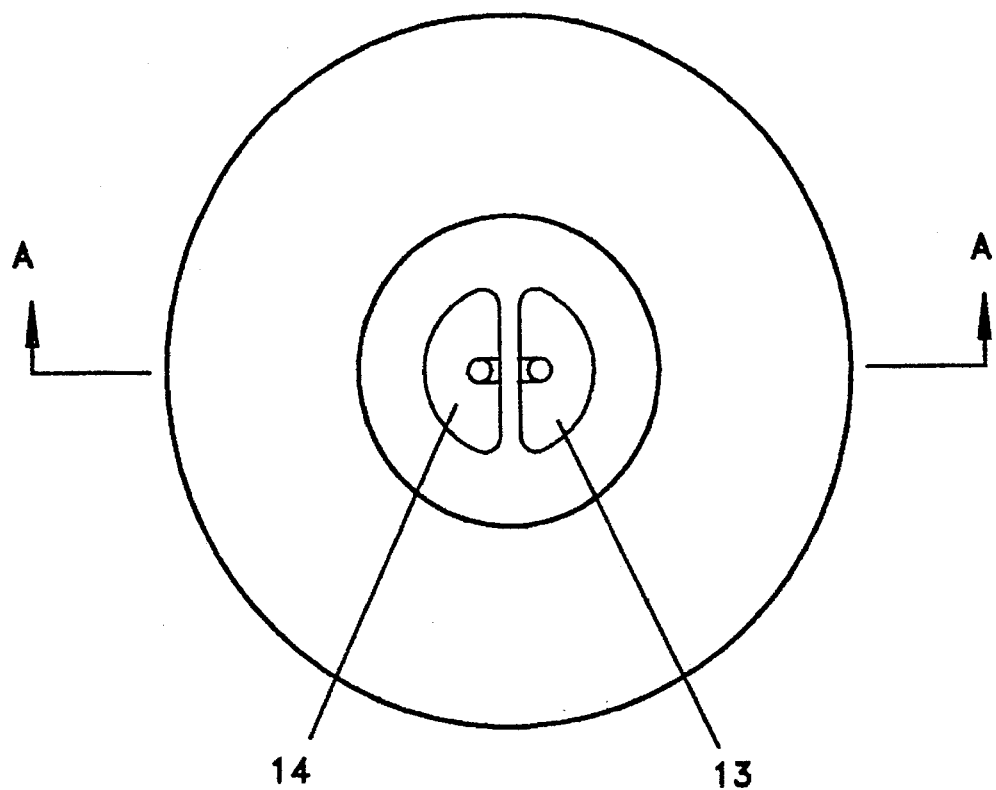
FIG. 3 is a top plan view of the plunger depicted in FIG. 1.

FIGS. 1 and 3 illustrate the plunger in accordance with the instant invention. Specifically shown is a plunger 10 for use in press-forming glass articles which has an upper portion 11 and a lower nose portion 15. The upper portion 11 of plunger 10 has an inlet cooling cavity 13 and a outlet cooling cavity 14. The nose portion 15 of plunger member 10 has a cooling passage 16 which has an inlet end 19 and an outlet end 20 connected to inlet cooling cavity 13 and outlet cooling cavity 14, respectively. Plunger 10 also has an outer glass contacting surface comprised of the upper portion glass contacting surface 17 and the nose portion outer glass contacting surface 18.

Figure 2:
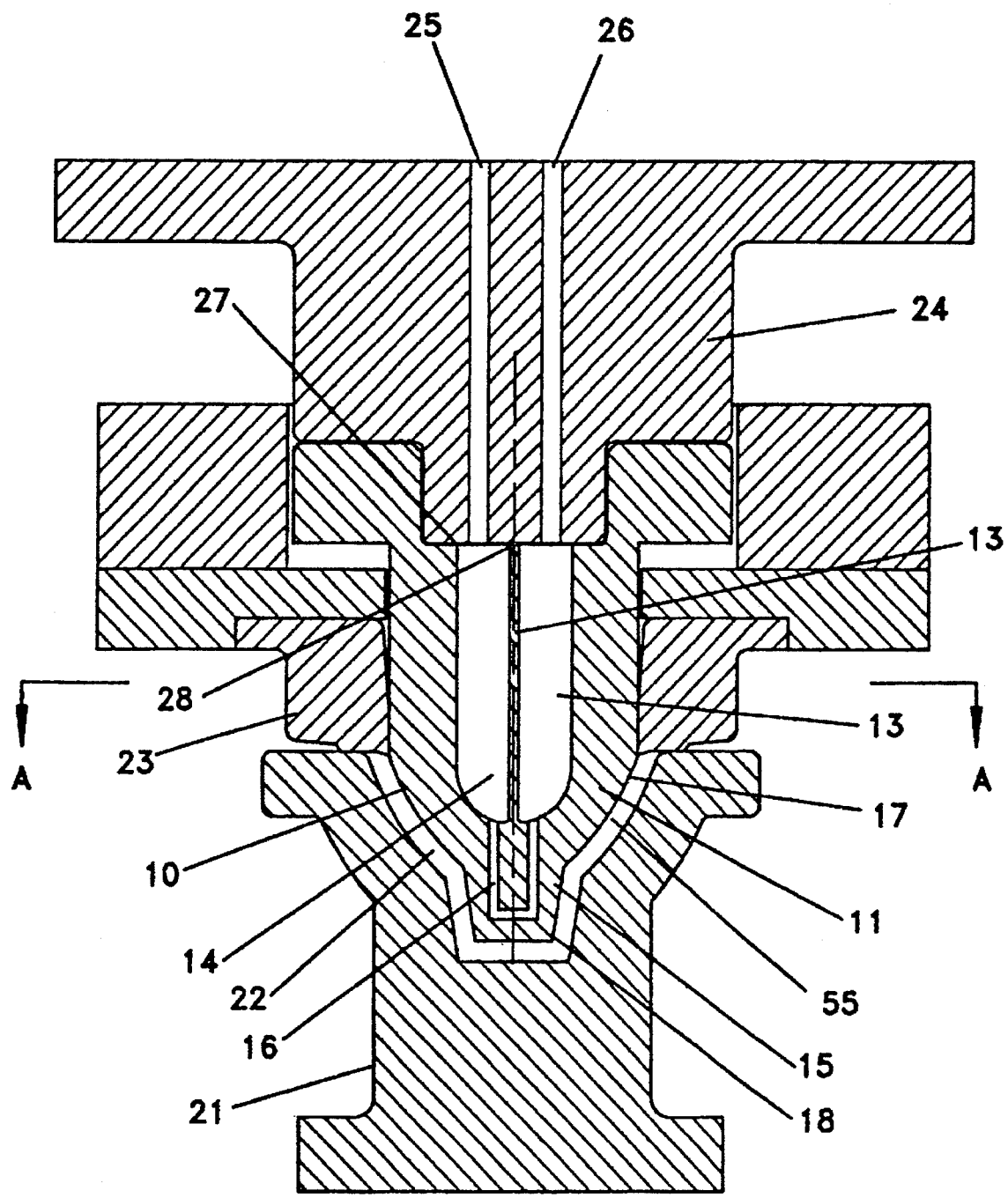
FIG. 2 is cross-sectional elevational view of the inventive glass pressing plunger, as depicted in FIG. 1, in cooperation with the forming mold and neck ring mold.

Referring now to FIG. 2, illustrated therein is an inventive apparatus for forming glass articles from molten glass. Specifically, the apparatus comprises a cooperative forming mold 21 possessing a glass contacting surface 22 and a plunger 10. As described above, plunger 10 has an upper body portion 11 and a lower nose portion 15, both having a glass contacting surface 17 and 18, respectively. The plunger 10 is shown in position for forming a glass article in cooperation with the forming mold 21, i.e, mold outer glass contacting surface 22 and plunger glass contacting surfaces 17 and 18 form a glass cavity 55 exhibiting the shape of the desired glass article. Upper body portion 11 has an inlet cooling cavity 13 and an outlet cooling cavity 14 separated by a dividing wall 12.

A plunger head 24, positioned on the top surface of the plunger 10, contains an inlet passage 26 which is connected to inlet cooling cavity 13; the inlet passage 26 and the inlet cavity 13 function together to supply cooling fluid to the plunger 10. Plunger head 24 also has an outlet passage 25 which is connected to outlet cooling cavity 14, which together function to exhaust spent cooling fluid from plunger 10.

As earlier detailed, the lower nose portion 15 has a cooling passage 16 with an inlet end and an outlet end which are connected to the inlet 13 and outlet 14 cooling cavities, respectively. The cooling passage 16 should be located along the periphery of the nose portion 15. Specifically, cooling passage 16 should be positioned in the nose portion 15 such that it is able to carry cooling fluid as close as possible to the nose portion's 15 outer glass contacting surface 18 without a loss of strength or risk of overcooling of the contacting surface 18. Cooling passage 16 should be sized so that it (coupled with location of the passage) results in the correct amount of cooling to the nose portion outer glass contacting surface 18. In other words, the location and the size of the cooling channel necessary to properly cool the nose portion glass contacting surfaces should be empirically determined for each different glass article/different glass plunger configuration.

On the other hand, the inlet and the outlet cavities 13 and 14 should be shaped such that they, when combined with the cooling of the cooling passage, result in a cooling effect whereby the plunger exhibits a uniform thermal profile over the entire outer glass contacting surface, 17 and 18. Preferably, the inlet cooling cavity 13 and the outlet cooling cavity 14 are symmetrically shaped.

A neck ring mold 23 of a usual and well known type is also shown resting on the upper surface of mold 21, the inner periphery of such neck ring mold 23 closely fitting with the outer perimeter of plunger 10 above the outer glass contacting surface 17 of the plunger 10.

The plunger 10 should be sealed to the plunger head 24 so that a complete seal is formed around inlet cooling cavity 13 and the outlet cooling cavity 14. Specifically, a sealing mechanism should be placed at the junction 27 between the plunger head 24 and the upper portion of the plunger 10 as well as the junction 28 between the plunger divider wall 12 and the plunger head 24. It is necessary to maintain this sealed condition around the cavities so that the cooling fluid is forced into the sealing passage 16 rather than leaking out the top of the inlet 13 and outlet 14 cooling cavities.

For the purpose of a better understanding of the inventive method described herein, there is provided in FIG. 1, to the extent possible without confusion with the reference characters shown therein, a plurality of arrows intended to illustrate the internal flow of the cooling fluid through the apparatus of the invention. This method of differentially cooling a plunger for press forming glass articles in a cooperative forming mold is specifically designed for the plunger having a upper body portion requiring low heat removal rates and an integral lower nose portion requiring higher heat removal rates. Referring to FIGS. 1 and 2, the method comprises first introducing the cooling fluid into the inlet cooling cavity 13 located in the upper portion 11 of the plunger 10. The cooling fluid is thereafter caused to flow from the inlet cooling cavity 13 into a cooling passage 16 located along the periphery of the nose portion 15. Thereafter, the cooling fluid is cause to flow into a outlet cooling cavity 14 located in the upper portion 11 of the plunger 10. Once the cooling fluid exits the outlet cavity into the outlet passage 25 it is thereafter exhausted from the plunger.

The residence time of the cooling fluid in the cooling passage is less than the residence time of the cooling fluid in either the inlet or outlet cooling cavities. However the residence in each is of a sufficient time to effectively cool the nose portion and the upper portion, respectively, and to result in a uniform thermal profile along the glass contacting surface 17 and 18. Stated another way, for a given flow rate, the velocity of the cooling liquid is significantly higher in the cooling passage when compared to that in the cooling cavities. The higher heat transfer coefficient resulting from the higher velocity combined with the thinner plunger cross section at the nose results in a uniform thermal profile along glass contacting surfaces 17 and 18.

Although the cooling fluid described herein is water, it should also be pointed out that the cooling fluid employed in practicing the invention disclosed can, for example, be air from a fan, compressed air, an air/water mixture or any other suitable transfer fluid.

EXAMPLE

Figure 4:
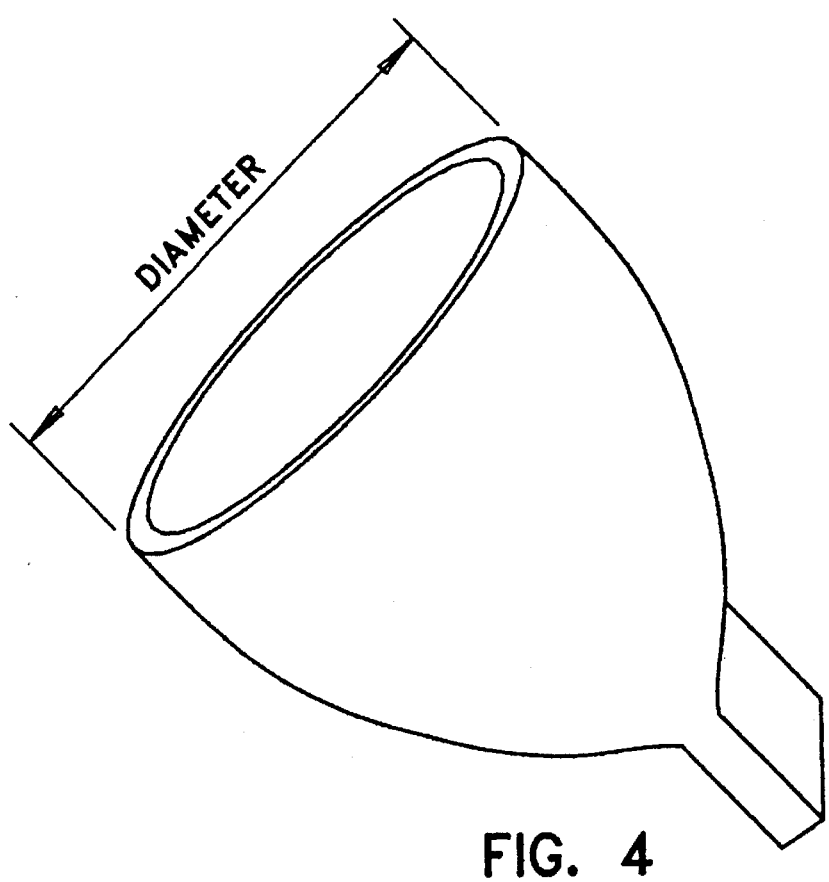
FIG. 4 is a perspective view of a lighting reflector product capable of being produced utilizing the apparatus and method disclosed herein.

The apparatus and the method described above have been successfully utilized to produce a glass article of the shape as depicted in FIG. 4; a lighting reflector product possessing a thickness of about 0.1", a diameter of 1.6" (indicated as D) and a nose portion exhibiting dimensions of 0.5"×0.5"×0.2" thick. A glass charge having a composition of Corning Code 7251 glass was delivered to a mold/press assembly as depicted in FIG. 3 and sized to result in the aforementioned glass lighting reflector. Additionally, the plunger exhibited a cooling passage of a 0.06" diameter and symmetrically "half moon" shaped inlet and outlet cavities.

These tooling components were heated to a temperature range of 400° C.–500° C. so that the tooling components contacting the glass neither checked the glass by being too cold, nor stuck to the glass by being too hot. The glass charge, consisting essentially of the following composition, expressed in terms of weight percent on the oxide: 77.4% $SiO_2$, 5.3% $Na_2O$, 15.4% $B_2O_3$, 1.9% $Al_2O_3$, 0.48 Cl., and large enough to ultimately fill the mold cavity, was then delivered at a temperature such that the glass exhibited a viscosity range of 2000–3000 poise. The glass charges were delivered and subsequently pressed at a rate of 60 pieces per minute.

The plunger, made from HR34 nickel alloy, was internally cooled by water flow through the plunger apparatus in a flow pattern as detailed above. In order for the cooling to be predictable and repeatable, the cooling fluid, in this example water, was regulated at the outlet and was of uniform inlet temperature. The water flow was regulated at a range of 0.3–0.35 gallons per minute, the inlet pressure and temperature range were 50 psi and 95±2° F., respectively, while the back pressure on the outlet was maintained at 10 psi.

The finished glass reflector article possessed similar dimensions and quality to that which could be achieved by the prior art pressing techniques. Thus, clearly demonstrating that the inventive apparatus and method could be utilized to manufacture a glass product at higher speeds with no reduction in selection rate.

The improved plunger design incorporated into the molding system and utilized in the inventive method disclosed herein has several important advantages over prior art methods for pressing complex articles. Among these advantages are: 1) An increased press speed of up to 60 pieces per minute for complicated article shapes; an output that far exceeds the industry standard for complex glass articles; 2) Although the above method and apparatus is not limited to water, the ability to use water cooling on articles of this size, where geometry would not allow water cooling in the past due to over cooling, is a significant advantage; 3) A reliable supply of cooling fluid to the nose portion due to the pressurized system and the divided body cavity; and, 4) A more uniform thermal profile over the glass contact surface of the plunger, resulting in better glass quality.

Although there is herein shown and described only one specific form of apparatus embodying the invention, it will be understood by one skilled in the art that such is not to be considered in any way limiting but that various changes or modifications may be made therein within the purview of the appended claims without departing for the spirit and scope thereof.

We claim:

1. Apparatus for forming glass articles from molten glass comprising:

a forming mold;

a neck ring mold;

a plunger head having a coolant inlet passage and a coolant outlet passage;

a plunger having a upper body portion and an integral lower nose portion, each having a glass contacting surface, the upper body portion having a pair of enclosed cooling cavities including an inlet cooling cavity and an outlet cooling cavity separated by a dividing wall and for supplying and returning cooling fluid and connected to the inlet and outlet passages, respectively, the lower nose portion having a cooling passage having an inlet end and outlet end connected to the inlet and outlet cooling cavities, respectively, wherein the shape, location and size of the cooling passage and the inlet and outlet cooling cavities are selected to provide glass contacting surfaces which exhibit a substantially uniform thermal profile.

2. The apparatus of claim 1 wherein the cooling passage is located along the periphery of the nose portion.

3. The apparatus of claim 1 wherein the inlet cooling cavity and the outlet cooling cavity are symmetrically shaped.

4. A method of differentially cooling a plunger for press forming glass articles in a cooperative forming mold, the plunger having a upper body portion requiring low heat removal rates and an integral lower nose portion requiring higher heat removal rates, each having a glass contacting surface, the method comprising:

introducing a cooling fluid into an inlet cooling cavity located in the upper portion of the plunger and causing the cooling fluid to flow from the inlet cooling cavity into a cooling passage located along the periphery of the nose portion while maintaining a substantially uniform thermal profile on the glass contacting surfaces, and thereafter to flow into a outlet cooling cavity located in the upper portion of the plunger and thereafter exhausting the spent cooling fluid from the plunger.

5. The method as claimed in claim 4 wherein residence time of the cooling fluid in the cooling passage is less than the residence time of the cooling fluid in either the inlet or outlet cooling cavities.

6. A plunger for use in press-forming glass articles comprising an upper portion having a glass contacting surface and an inlet cooling cavity and an outlet cooling cavity, and a nose portion having a second glass contacting surface and a cooling passage, the cooling passage having an inlet and an outlet end connected to the inlet and outlet cooling cavities, respectively, the shape, location and size of the cooling cavities and the cooling passage are selected such that the glass contacting surfaces exhibit a substantially uniform thermal profile during molding.

7. The apparatus of claim 6 wherein the cooling passage is located along the periphery of the nose portion.

8. The apparatus of claim 6 wherein the inlet cooling cavity and the outlet cooling cavity are symmetrically shaped.

* * * * *